United States Patent
Baumgartner, IV

(10) Patent No.: US 8,620,781 B2
(45) Date of Patent: Dec. 31, 2013

(54) FUND ON ACTIVATION

(75) Inventor: David Ross Baumgartner, IV, Highlands Ranch, CO (US)

(73) Assignee: Visa U.S.A. Inc., San Francisco, CA (US)

( * ) Notice: Subject to any disclaimer, the term of this patent is extended or adjusted under 35 U.S.C. 154(b) by 162 days.

(21) Appl. No.: 12/482,079

(22) Filed: Jun. 10, 2009

(65) Prior Publication Data

US 2009/0307118 A1 Dec. 10, 2009

Related U.S. Application Data

(60) Provisional application No. 61/060,325, filed on Jun. 10, 2008.

(51) Int. Cl.
*G07F 19/00* (2006.01)

(52) U.S. Cl.
USPC .............................................. 705/34; 705/35

(58) Field of Classification Search
USPC ........................................................... 705/34
See application file for complete search history.

(56) References Cited

U.S. PATENT DOCUMENTS

| | | |
|---|---|---|
| 5,477,038 A | 12/1995 | Levine et al. |
| 7,593,896 B1 * | 9/2009 | Flitcroft et al. ................. 705/39 |
| 2003/0144935 A1 * | 7/2003 | Sobek ............................. 705/35 |
| 2008/0029608 A1 | 2/2008 | Kellum et al. |
| 2008/0162339 A1 * | 7/2008 | Lawe ............................... 705/39 |
| 2009/0055317 A1 * | 2/2009 | Andalib et al. ................. 705/41 |
| 2009/0327087 A1 * | 12/2009 | Beck et al. ...................... 705/21 |

OTHER PUBLICATIONS

"While Ameriprise Financial, Inc. Approve Investors", and Receive Contract M2 Presswire, Dec. 29, 2006, Proquest Search.*
PCT International Search Report dated Jul. 24, 2009. US.
PCT Search Report, international Aiviication No. PCT/US2009/046768, dated Jul. 30, 2009.
PCT Written Opinion, International Application No. PCT/US2009/046768, dated Jul. 30, 2009.
PCT Internatioal Preliminary Report on Patentability, International Application No. PCT/US2009/046768, Dec. 13, 2010.

* cited by examiner

*Primary Examiner* — Garcia Ade
(74) *Attorney, Agent, or Firm* — Walter G. Hanchuk; Nathan W. Poulsen; Cooley LLP

(57) ABSTRACT

A system and method of funding a financial transaction card, providing a financial transaction card to a user, wherein the financial transaction card has a face value and wherein an amount of funds pertaining to the face value is placed in a liability account, and wherein the financial transaction card has an actual value of zero, activating the financial transaction card by the user; and funding a funds pool for the financial transaction card with the funds from the liability account after the activation of the financial transaction card, wherein only funds from the funds pool is available for conducting a purchase.

13 Claims, 11 Drawing Sheets

FUND ON ACTIVATION

FIELD OF THE INVENTION

Aspects of the present invention relate to financial transaction cards. More specifically, the embodiments relate to funding technologies for financial transaction cards as well as the cards themselves.

BACKGROUND INFORMATION

Customers use pre-funded financial transaction cards for a variety of purposes. Pre-funded financial transaction cards (also referred to as "prepaid debit cards") allow for the flexibility of eliminating use of cash with merchants, coupled with the convenience of ordinary credit card transactions. Pre-funded financial transaction cards also allow the bearer of the card to eliminate the potential for overdrafts as the pre-funded transaction card has a finite amount of funds allocated to the card. Consequently, the bearer will not have to pay interest fees for the card, as the possibility of overdraft does not exist.

While pre-funded transaction cards have many advantages, there are significant drawbacks for the cards. In conventional pre-funded transaction cards, the cards are funded at the time the card is purchased. The pre-funding of the card necessitates that the money pertaining to the card value is contained in an account, ready for usage by the bearer.

For large purchasers of pre-funded financial transaction cards, such as for use as a promotional item, the purchaser must purchase each card at full value. For large purchases, the purchaser must commit significant money to the card issuer. If the promotional item is not used by a potential customer, then the purchaser still has paid for the pre-funded transaction card. The purchaser has spent money on each potential customer, regardless of if the pre-funded transaction card is actually used by the customer.

SUMMARY

An embodiment provides a method of funding a financial transaction card. In this non-limiting embodiment, the method comprises providing a financial transaction card to a user, wherein the financial transaction card has a face value and wherein an amount of funds pertaining to the face value is placed in a liability account, and wherein the financial transaction card has an actual value of zero, activating the financial transaction card by the user, and funding a funds pool for the financial transaction card with the funds from the liability account after the activation of the financial transaction card, wherein only funds from the funds pool is available for conducting a purchase.

In another embodiment, the method may further comprise completing a financial transaction with the financial transaction card. In another non-limiting embodiment, the method may further comprise for calculating a periodic fee for the financial transaction card after the providing of the financial transaction card to the user, the period fee sum totaled in a fee asset account. The method may further comprise deducting the fee asset account for the financial transaction card from the funds pool to produce a new amount in the funds pool. In another embodiment, the periodic fee is a monthly maintenance fee.

In another embodiment, the method may include notifying an issuer that the financial transaction card is one of lost and stolen by the user, and inactivating the financial transaction card that has been notified as one of lost and stolen by the user.

In yet another non-limiting embodiment, the method further comprises ordering a replacement financial transaction card for the financial transaction card that is one of lost and stolen, and supplying the replacement financial transaction card to the user.

In another embodiment, the method may be performed on a financial transaction card has an expiration date. The method may further comprise inactivating the financial transaction card when the expiration date is reached. The method may also be accomplished such that upon inactivating the financial transaction card when the expiration date is reached, the funds of the financial transaction card in the liability pool are transferred into an expired liability pool. In all embodiments, the method may further be accomplished to refund the financial transaction card with a new amount of funds in the funds pool upon issuer authorization. The refunding of the financial transaction card with the new amount of funds may be accomplished up to the face value of the financial transaction card in another embodiment.

In another embodiment, a financial transaction card is presented. In this embodiment the financial transaction card is configured to interface with a computer system, wherein the card has a face value, and wherein an amount of funds pertaining to the face value is placed in a liability account, and wherein the financial transaction card has an actual value of zero and whereupon activation of the financial transaction card by the user, funds from a funds pool are provided for purchase of items. In an alternative embodiment, the financial transaction card is configured with at least one of an expiration date, a unique card identification number, a magnetic stripe and a hologram. In a still further embodiment, the financial transaction has a magnetic stripe, wherein the magnetic stripe interacts with the computer system to identify a unique card identification number.

DETAILED DESCRIPTION

An embodiment provides for an enhanced prepaid financial transaction card and to a method to provide new functionality for such financial transaction cards. An embodiment provides for a method herein referred to as "Fund on Activation" that allows a buyer to fund a financial transaction card, for instance a prepaid card only after the card has been activated by the cardholder.

Aspects of the present invention include the realization that it is possible to provide a transaction card and a method for funding a transaction card that will minimize the amount of money that a purchaser commits when purchasing the card.

Other aspects include a transaction card and a method to fund the card that will provide for the security of the funds during use, while maintaining the convenience of use of the card.

Aspects further include the understanding that provide a transaction card and a method to fund the card to minimize overall production and economic costs for the purchaser of the card.

For the purposes of this application, the terms "prepaid financial transaction card," "transaction card," "gift card," "prepaid card" and "prepaid payment card" are synonymous.

Conventional cards, contrary to the invention, are funded at the time the cards are purchased from a vendor, causing the purchaser to expend dollars on cards that may not be used or desired by customers. For conventional cards, many companies that purchase cards only pay for a card once the consumer shows intent to actually use the card (by activating the card). For example, a company may order one thousand $25 gift cards that the company sends to potential customers in a mail/advertising campaign. Advertising that comes with the cards states that the potential customer may activate the $25 gift card once they order a specified product or service.

Figure 9:
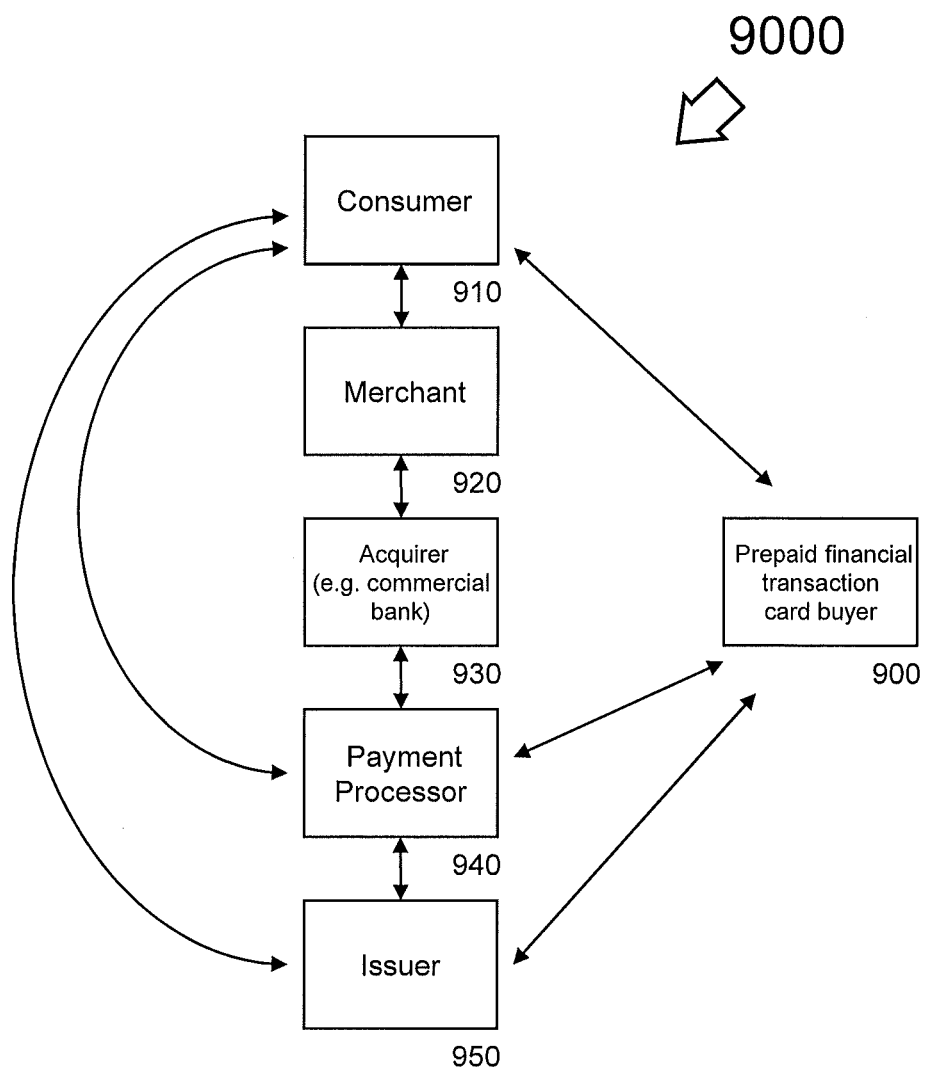
FIG. 9 depicts a system that facilitates the purchase and creation of a fund-on-activation prepaid financial transaction card.

In contrast, system 9000, depicted in FIG. 9, facilitate the purchase and creation of a fund-on-activation prepaid financial transaction card, constructed and operative in accordance with an embodiment of the present invention. In this example, the prepaid payment card buyer 900 does not pay the issuer 950 (the company producing the cards) $25,000 up front ($25×1,000 cards) but rather pays for each $25 gift card as they are activated. Consequently, a small fraction of the potential $25,000 of card value is incurred by the prepaid financial transaction card buyer 900. Aspects apply to disposable gift, bulk gift, and reloadable card program types.

The prepaid financial transaction card is sent to a consumer 910, which communicates with issuer 950 to activate the card. The prepaid financial transaction card may then be used at merchant 920 in a standard debit-gift card transaction, processed by an acquirer 930 and payment processor 940. Acquirer 930 may be any standard commercial bank, while payment processor 940 may be any payment network known in the art. Examples of payment networks include: Visa™, MasterCard™, and American Express™.

Issuer 950 may be any financial institution that issues the prepaid financial transaction card.

Examples will be described in which prepaid financial transaction cards are purchased from, activated by and/or processed by issuer 950. It is understood by those in the art that prepaid financial transaction cards may also be purchased from, activated by and/or processed by payment processor 940.

Figure 10:
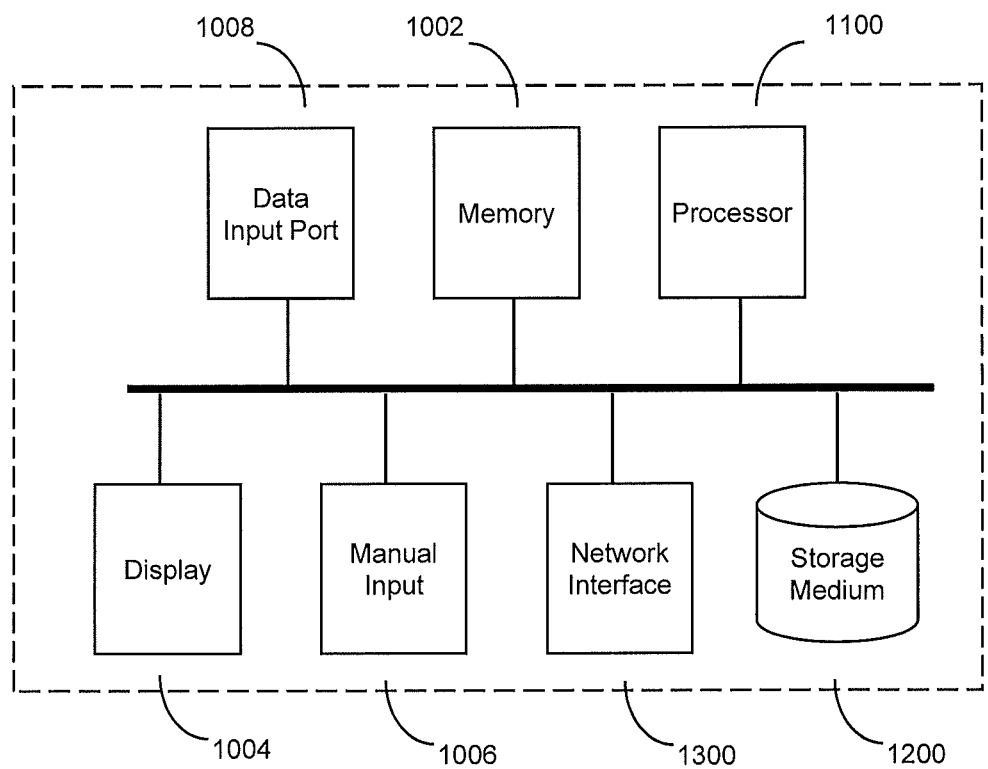
FIG. 10 is a block diagram of an issuer or payment processing device that facilitates the purchase and creation of a fund-on-activation prepaid financial transaction card.

Turning to FIG. 10, FIG. 10 depicts a payment processor or issuer prepaid financial transaction card server 940 or 950 configured to fulfill orders and/or activate the pre-funded payment card, constructed and operative in accordance with an embodiment of the present invention. For the sake of example, we assume the device is issuer 950. Issuer prepaid financial transaction card server 950 comprises: a processor 1100, memory 1002, storage medium 1200, and network interface 1300. Issuer prepaid financial transaction card server 950 may also contain one or more of the following: display 1004, manual input 1006, and data input port 1008.

Issuer prepaid financial transaction card server 950 may run a multi-tasking operating system (OS) and include at least one processor or central processing unit (CPU) 1100. Processor 1100 may be any central processing unit, microprocessor, micro-controller, computational device or circuit known in the art.

Memory may be any Random Access Memory known in the art.

Display 1004 may be a visual display such as a cathode ray tube (CRT) monitor, a liquid crystal display (LCD) screen, plasma display, projector, organic light emitting diode (OLED) display, touch-sensitive screen, or other monitors as are known in the art for visually displaying images, graphics and/or text to a user.

Manual input device 1006 may be a conventional keyboard, keypad, mouse, trackball, or other input device as is known in the art for the manual input of data.

Data input port 1008 may be any data port as is known in the art for interfacing with a consumer 910, such as a telephone, instant messaging, World-Wide-Web, or electronic-mail interface. In some embodiments, data input port 1008 an external accessory using a data protocol such as RS-232, Universal Serial Bus (USB), or Institute of Electrical and Electronics Engineers (IEEE) Standard No. 1394 ('Firewire').

Network interface 1300 may be any data port as is known in the art for interfacing, communicating or transferring data across a computer network, examples of such networks include Transmission Control Protocol/Internet Protocol (TCP/IP), Ethernet, Fiber Distributed Data Interface (FDDI), token bus, or token ring networks. Network interface 1100 allows issuer prepaid financial transaction card server 950 to communicate with issuer 1500, and may allow communication with acquirer 1300.

Computer-readable storage medium 1200 may be a conventional read/write memory such as a magnetic disk drive, floppy disk drive, compact-disk read-only-memory (CD-ROM) drive, digital versatile disk (DVD) drive, high definition digital versatile disk (HD-DVD) drive, magneto-optical drive, optical drive, flash memory, memory stick, non-volatile transistor-based memory or other computer-readable memory device as is known in the art for storing and retrieving data. Significantly, computer-readable storage medium 1200 may be remotely located from processor 1100, and be connected to processor 1100 via a network such as a local area network (LAN), a wide area network (WAN), or the Internet.

Figure 11:
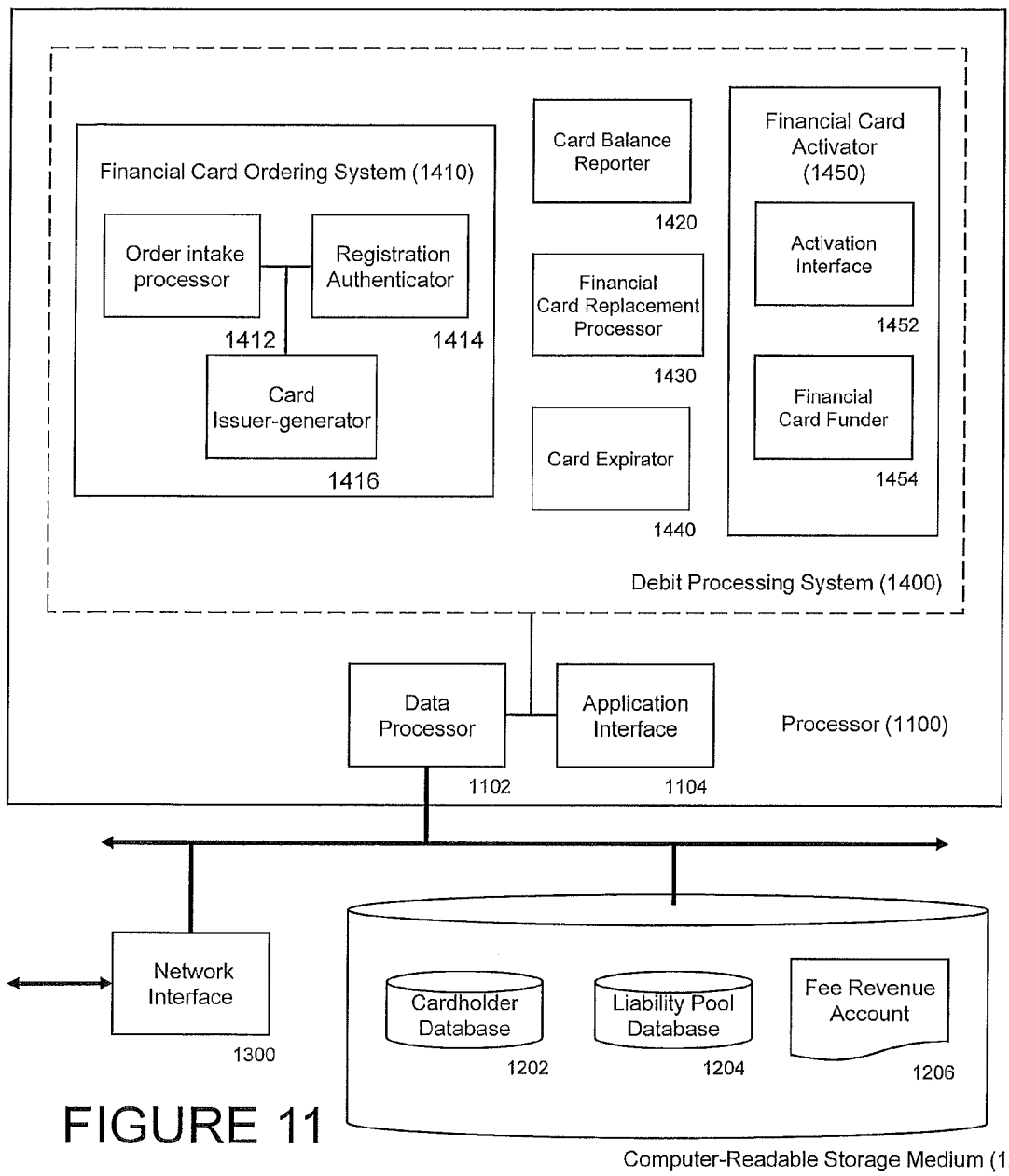
FIG. 11 illustrates a more detailed issuer or payment processing device that enables the purchase and creation of a fund-on-activation prepaid financial transaction card.

FIG. 11 illustrates a more detailed issuer or payment processing device 950 that enables the purchase and creation of a fund-on-activation prepaid financial transaction card.

It is well understood by those in the art, that the functional elements of FIG. 11 may be implemented in hardware, firmware, or as software instructions and data encoded on a computer-readable storage medium 1200. As shown in FIG. 11, processor 1100 is functionally comprised of a financial card ordering system 1410, a financial card activator 1450, and data processor 1102. Processor 1100 may also include card balance reporter 1420, financial card replacement processor 1430, card expirator 1440, and application interface 1104. Financial card ordering system 1410 may further comprise: order intake processor 1412, registration authenticator 1414, and card issuer-generator 1416. Financial card activator 1450 may also comprise an activation interface 1452, and financial card funder 1454. These structures may be implemented as hardware, firmware, or software encoded on a computer readable medium, such as storage media 1200.

Data processor 1102 interfaces with storage medium 1200, display 1004, manual input 1006, data input port 1008, and network interface 5400. The data processor 1102 enables processor 1100 to locate data on, read data from, and writes data to, these components.

In addition, as shown in FIG. 11, storage media 1200 may also contain cardholder database 1202, liability pool database 1204, and/or fee revenue account information 1206. Note that in some embodiments, cardholder database 1202, liability pool database 1204, and/or fee revenue account information 1206 may be located across a network at an alternate computer-readable storage medium, payment processor 940, or issuer 950.

The function of these structures may best be understood with respect to FIGS. 1-8, as described below.

Figure 1:
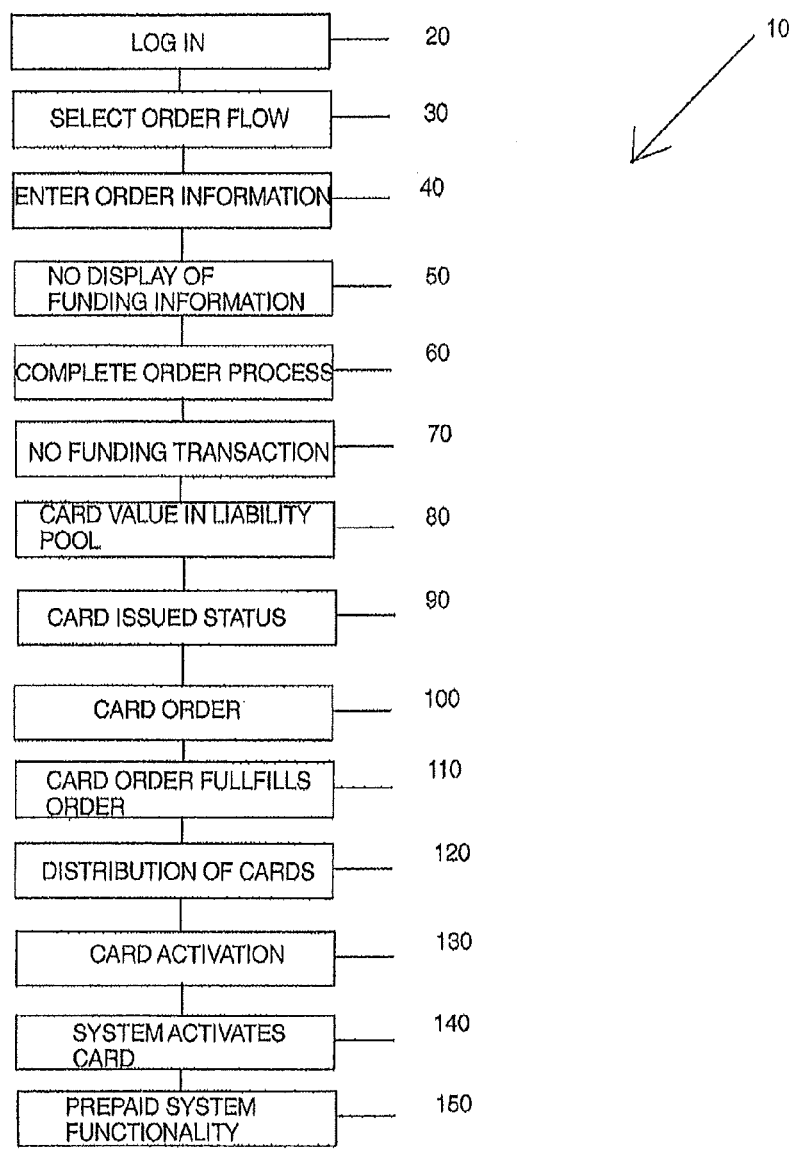
FIG. 1 is a large prepaid financial transaction card buyer 900 order flowchart for purchase and manufacture of a transaction card.

Referring to FIG. 1, a large prepaid financial transaction card buyer 900 order process 10 for a financial transaction card is illustrated in an embodiment, constructed and operative in accordance with an embodiment of the present invention. In the process 10, debit processing system 1400a is contacted by prepaid financial transaction card buyer 900, block 20. The financial card ordering system 1410 presents a large prepaid financial transaction card buyer 900 order flow 30 to buyer 900. The intake processor 1412 receives all pertinent order information from buyer 900, block 40. At block 50, the system does not display the "Funding Information" screen(s) (or collect any additional funding data) because the cards are being purchased using the Fund on Activation process. The buyer 900 then completes the order process at block 60. The system does not perform any funding transaction for the card order as part of the order completion process 70. The card value for the order is recorded in a Liability Pool database 1204, block 80.

Purchase and order fees are reported in the Fee Revenue Account 1206 for the card program at the time of the purchase.

The cards are issued with a "card issued" status 90 stored in cardholder database 1202, and the card issuer-generator 1416 records that the each card has a pending balance (equal to the card value) and a zero available and ledger balance. The card issuer-generator 1416 then generates a card order, block 100. A card vendor (either issuer 950 or payment processor 940), for example, fulfills order and delivers to purchasing prepaid financial transaction card buyer 900, block 110. The prepaid financial transaction card buyer 900 then distributes the prepaid cards 120. The cardholder then activates the financial transaction card 130. If the order is a large order, the large order may be bulk activated that would be funded as a result of the activation. The system then activates the card, performs funding for the card value, reports the funding transaction, and moves the funds from a "Liability Pool" to a "Funds Pool" 140. The system will perform individual funding transactions (so that the cardholder has funds immediately), but the system will consolidate the Buyer funding records for each day, for example. Once a card is activated and funded, the prepaid system performs all subsequent functions for prepaid card systems 150.

Figure 2:
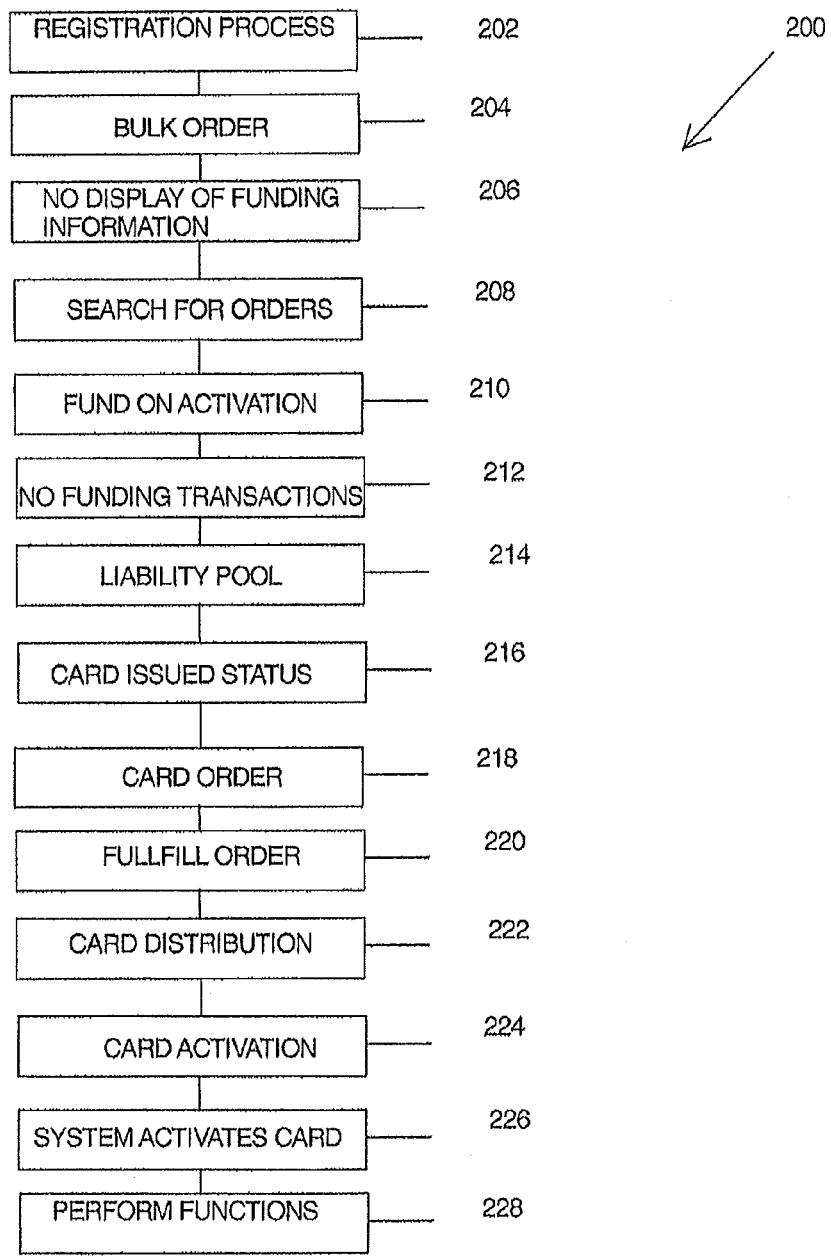
FIG. 2 is a corporate gift card flowchart for purchase and funding of the gift card.

Referring to FIG. 2, a flowchart for purchase and funding of the gift card for corporate gift cards is provided 200, constructed and operative in accordance with an embodiment of the present invention . . . . In the non-limiting embodiment, a prepaid financial transaction card buyer 900 logs into a financial card ordering system 1410 and completes a registration process 202 presented by registration authenticator 1414. Registration authenticator 1414 may query buyer 900 for a password, passkey or other authentication method known in the art. The prepaid financial transaction card buyer 900 initiates a bulk gift order at block 204. The order intake processor 1412 does not display the funding information pertaining to the financial transaction card as the cards are being purchased through the Fund on Activation process, block 206. The issuer 950 of the financial transaction card searches for outstanding bulk gift orders 208. The order has a funding method of "Fund on Activation", described above, for example, and the order is marked appropriately 210. The buyer 900 has the ability to change the payment method even though the Bulk Gift Company did not have a selection during the order process. The card issuer-generator 1416 does not perform any funding transaction for the card order as part of the order completion, block 212. The card value for the order is recorded in a Liability Pool database 1204, block 214. The cards are issued with a "Card Issued" status and the card issuer-generator 1416 records that each card has a pending balance (equal to the card value) and a zero available and ledger balance in the liability pool database 1204, block 216. The card issuer-generator 1416 then generates a card order, block 218. An issuer 950 then fulfills the order and delivers it to the purchasing buyer 900, block 220. Next, the prepaid financial transaction card buyer 900 distributes the financial transaction card at block 222. After receipt of the financial transaction card, the cardholder/consumer 910 activates the prepaid card at financial card activator 1450, block 224. In some embodiments, an activation interface 1452 may be web-enabled, or have a telephone interface. If the order is bulk activated, all cards are funded by the financial card funder 1454. The financial card funder 1454 then activates the card, performs funding for the card value, reports the funding transaction via a card balance reporter 1420, and moves the funds from the Liability Pool database to a "Funds Pool" within cardholder database 1202, block 226. Once a card is activated and funded, the debit processing system 1400 performs all subsequent functions 228 based upon transactions received.

Figure 3:
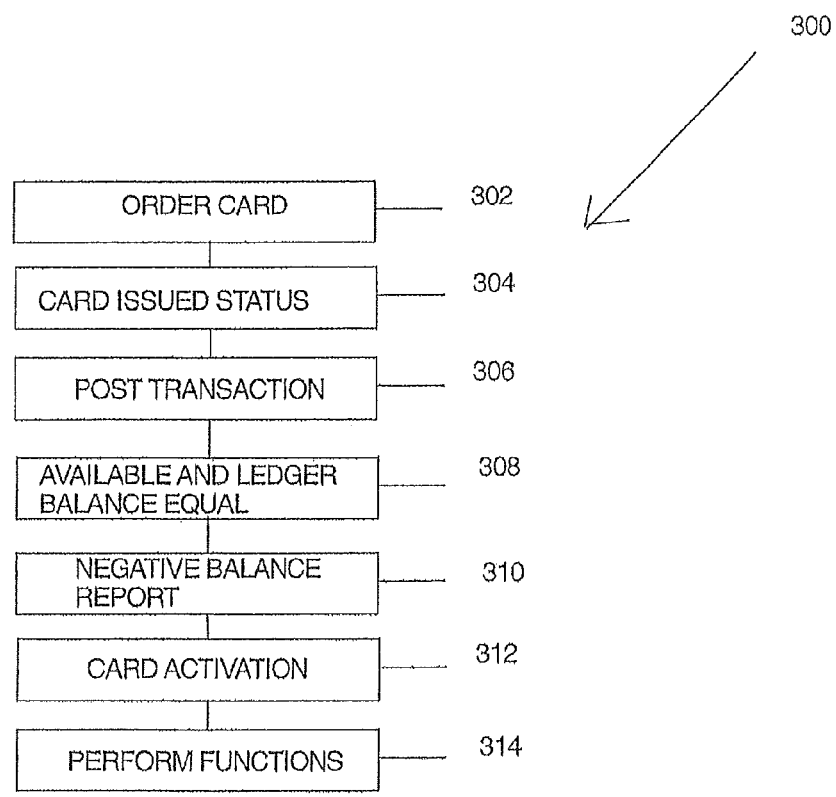
FIG. 3 is a financial transaction card funding method flowchart using a negative balance system.

FIG. 3 is a flowchart depicting how the debit processing system 1400 handles a card ordered using the "Fund on Activation" option, constructed and operative in accordance with an embodiment of the present invention. In this embodiment, the prepaid financial transaction card has not yet been activated when a posting item is processed for the card 300. This scenario is defined as a negative balance scenario. A financial transaction card, in this instance a prepaid card, is ordered, generated, and delivered to the cardholder 910, block 302. The financial transaction card uses the Fund on Activation process as described above. Next, the prepaid card has a card status of "Card Issued" in cardholder database 1202, block 304. In the embodiment provided, the card has a pending balance equal to the card value (in this example $50), a zero available balance and a zero ledger balance. A posting transaction (forced post) comes into and is processed by the debit processing system 1400 for the card (in this example the transaction amount is $20), block 306. The forced post item process is not impacted by the Fund on Activation process. After the posted item has been processed, the available and ledger balances are both equal to the forced post amount (a negative balance of $20 in this example) 308. The pending balance is not affected (it remains $50 in this case). The card is reported on negative balance reports until the card balance is made positive 310. Once the user authorizes activation, financial card activator 1450 activates the card 312. The card balance is affected by the negative card balance (in this example the card balance would be $50–$20=$30). The financial card funder 1454 performs funding for the full card value ($50), reports the funding transaction (for the $50), and moves the funds ($50) from the Liability Pool database 1204 to the "Funds Pool" in the cardholder database 1202. In the embodiment, the system will perform a "batch" funding for each order per day. For example, if five cards were activated from an order on the same day, the financial card funder 1454 performs one funding transaction for the value of the five cards combined. Once a card is activated and funded, the debit processing system 1400 performs all functions required for continued operation 314.

Figure 4:
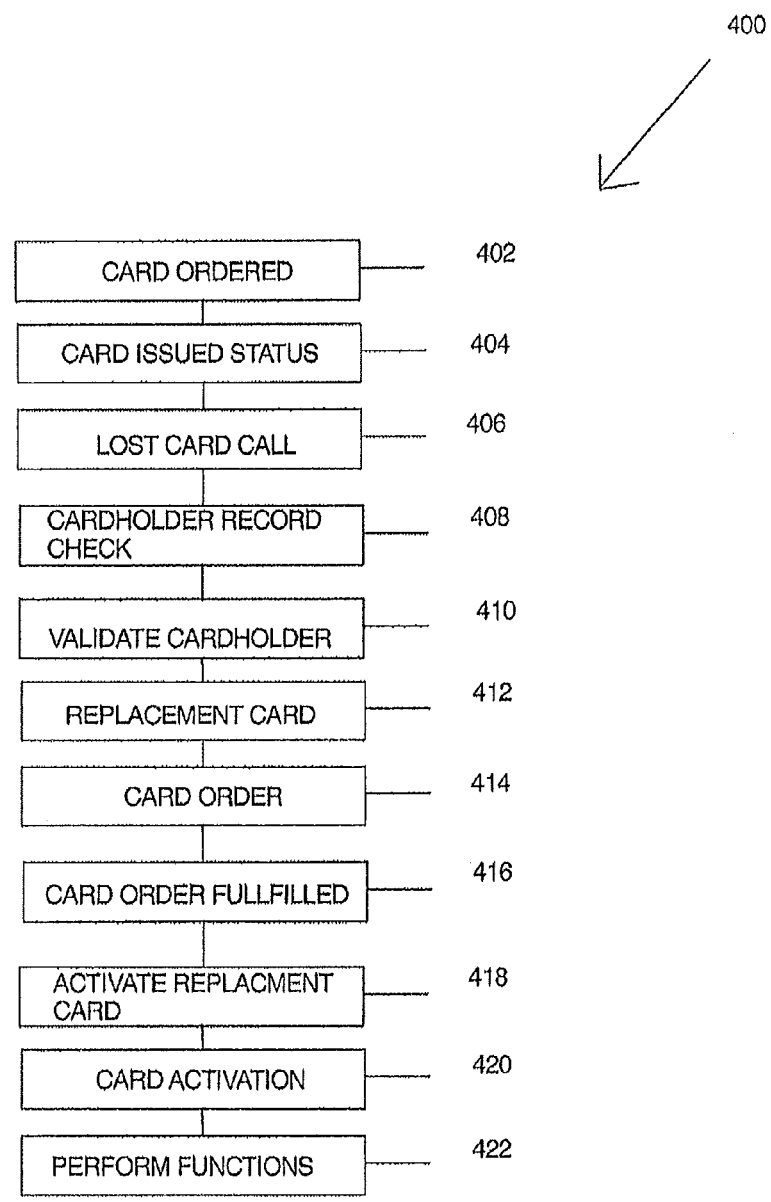
FIG. 4 is a financial transaction card method flowchart for transactions impacted by a lost/stolen card.

Referring to FIG. 4, a flowchart depicts a scenario of how the debit processing system 1400 treats a financial transaction card that has been ordered and delivered to the cardholder/consumer 910 using the "Fund on Activation" option, constructed and operative in accordance with an embodiment of the present invention. The cardholder/consumer 910 reports the card as lost or stolen, process 400. A financial transaction card, in this embodiment a prepaid card, is ordered, generated, and delivered to the cardholder 910 using the Fund on Activation process, block 402. The financial transaction card has a card status of "Card Issued," a pending balance equal to the card value, a zero available balance and a zero ledger balance, block 404. The cardholder 910 calls into a card holder call center to report the card as lost or stolen prior to activating the card 406. In some embodiments, a card holder call center is replaced by an automated financial card replacement processor 1430, as is known in the art. The financial card replacement processor 1430 queries the cardholder record in the cardholder database 1202 and identifies the card as a "Fund on Activation" card as a result of the Pending Card Balance field and a Card Status of "Card Issued", block 408. The financial card replacement processor 1430 validates the cardholder 910, block 410, marks the original card as lost or stolen and issues a replacement card. In the embodiment, the replacement card has the same properties as the original card—it has a pending balance and must be activated prior to the funding transaction occurring. The financial card replacement processor 1430 then generates a replacement card order 412. A card issuer-generator 1416 fulfills the order 416 and delivers to the cardholder. The cardholder 910 receives 416 and activates the replacement prepaid card 418. The system activates the card 420, performs funding for the card value, reports the funding transaction, and moves the funds from the "Liability Pool" to the "Funds Pool". Once the replacement card is activated and funded, the system performs all functions necessary for continued operation of the card within the available fund amount 422.

Figure 5:
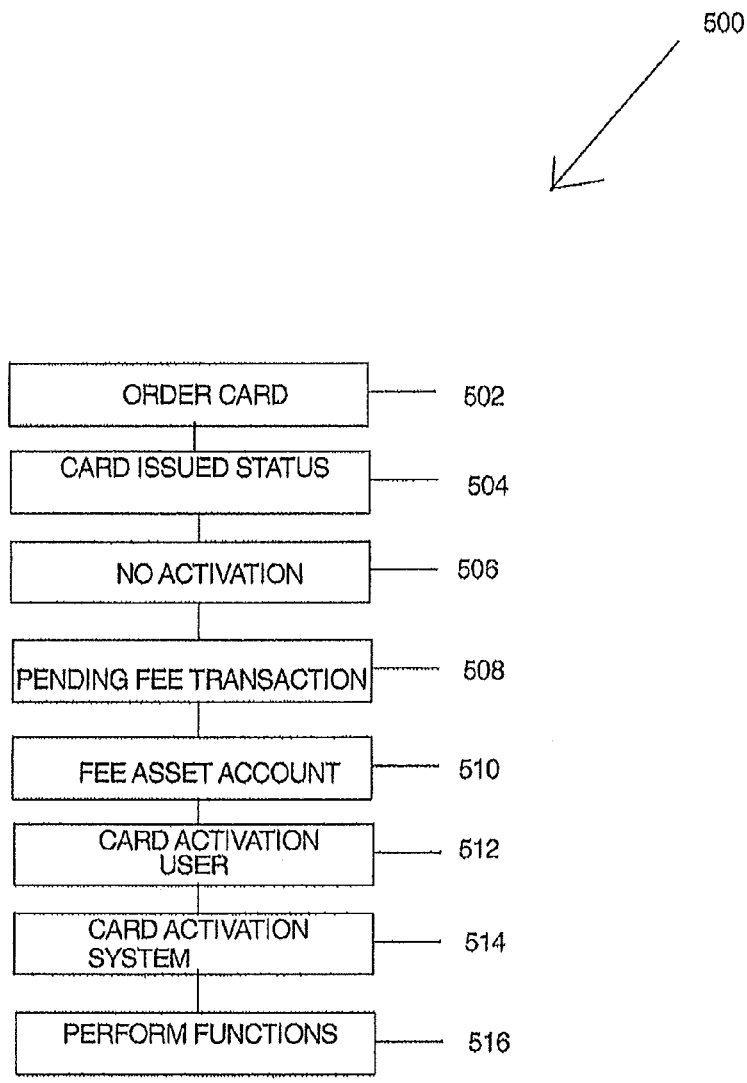
FIG. 5 is a financial transaction card method for handling fees prior to card activation.

Referring to FIG. 5, a flow chart 500 illustrating how the debit processing system 1400 for a financial transaction card handles the processing and reporting of cardholder fees, such as monthly maintenance fees, prior to the card's activation and funding, constructed and operative in accordance with an embodiment of the present invention. In this embodiment, a financial transaction card, in this instance a prepaid card, is ordered, block 502, generated, and delivered to the cardholder using the Fund on Activation process. In this embodiment, the financial transaction card, such as a prepaid card, has a card status of "card issued," block 504, a pending balance equal to the card value, a zero available balance and a zero ledger balance. The cardholder 910 does not activate the card prior to the assessment of cardholder fees, (such as monthly maintenance fee) 506. The debit processing system 1400 will perform a new "Pending Fee" transaction, block 508, to remove the fee from the Liability Pool database 1204, and post it to a new "Fee Asset Account," block 510. The fee value is removed from the card's pending balance (for example: if the card has a Pending Balance of $10 and a fee was assessed for $2, the card would then have a Pending Balance of $8 and the Fee Asset Account would now hold $2). The card balance reporter 1420 will then report the assessed fee on the "Fee Asset Account" report. Next, the cardholder activates the prepaid card, block 512. The financial card activator 1450 activates the card, block 514, performs funding for the full card value ($10 in the example above), reports the funding transaction, moves the pending balance (in this case $8) from the Liability Pool database 1204 to a "Funds Pool" and moves any assessed fees from the "Fee Asset Account" to the Fee Revenue Account 1206 ($2 using the above example). Once the replacement card is activated and funded, the system performs functions required to enable the user to conduct transactions 516.

Figure 6:
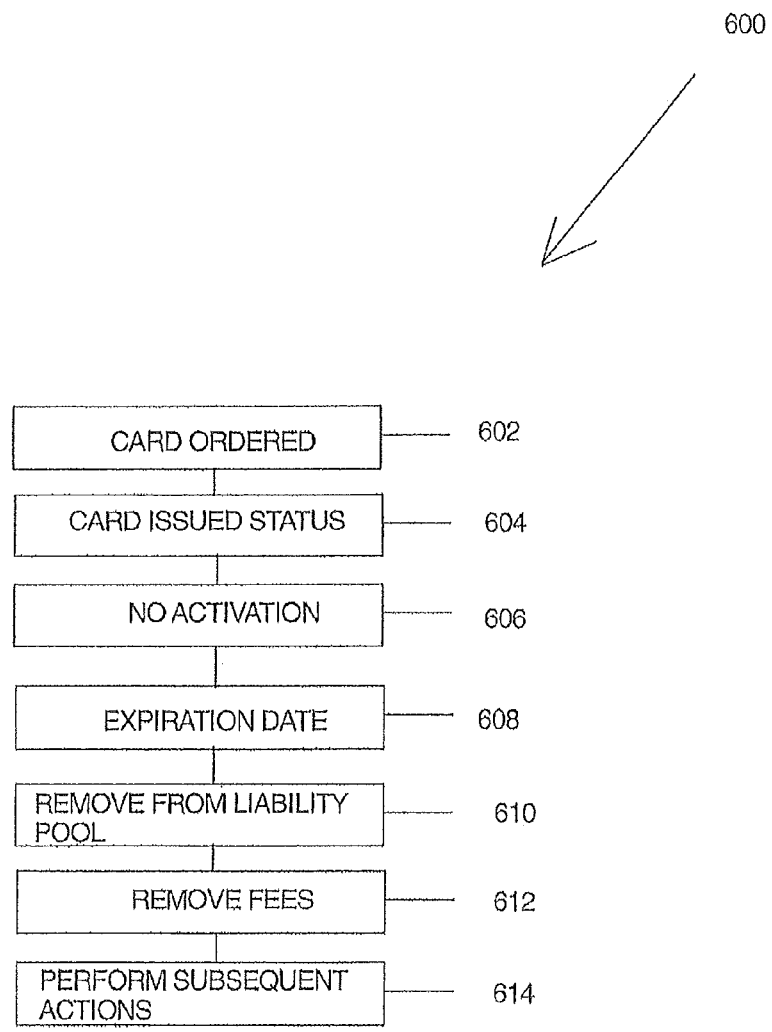
FIG. 6 is a financial transaction card method for handling funds for a card that expires prior to activation.

Referring to FIG. 6, a flowchart depicting how the system handles a card ordered using the "Fund on Activation" option, but expires prior to activation, process 600, constructed and operative in accordance with an embodiment of the present invention. A financial transaction card is ordered 602, generated, and delivered to the cardholder using the Fund on Activation process. The financial transaction card, in this case a prepaid card, has a card status of "Card Issued," block 604, a pending balance equal to the card value, a zero available balance and a zero ledger balance. In this scenario, the cardholder never activates the prepaid card, block 606. The card reaches its expiration date and the card expirator 1440 changes the card's status to "Expired," block 608. The financial transaction card system removes the card balance from the Liability Pool database 1204 (using a new recorded transaction that removes the balance from the Liability Pool but does not add the funds to the Funds Pool), the pending card balance is now zero and the transaction is reported on an "Expired Liability Pool" report, block 610. The card expirator 1440 removes any assessed cardholder fees from the "Fee Asset Account" but does not transfer those funds to the fee revenue account 1206, and reports this value on the new "Expired Liability Report," block 612. Once the card is changed to "Expired", the system performs all subsequent actions accordingly, block 614.

Figure 7:
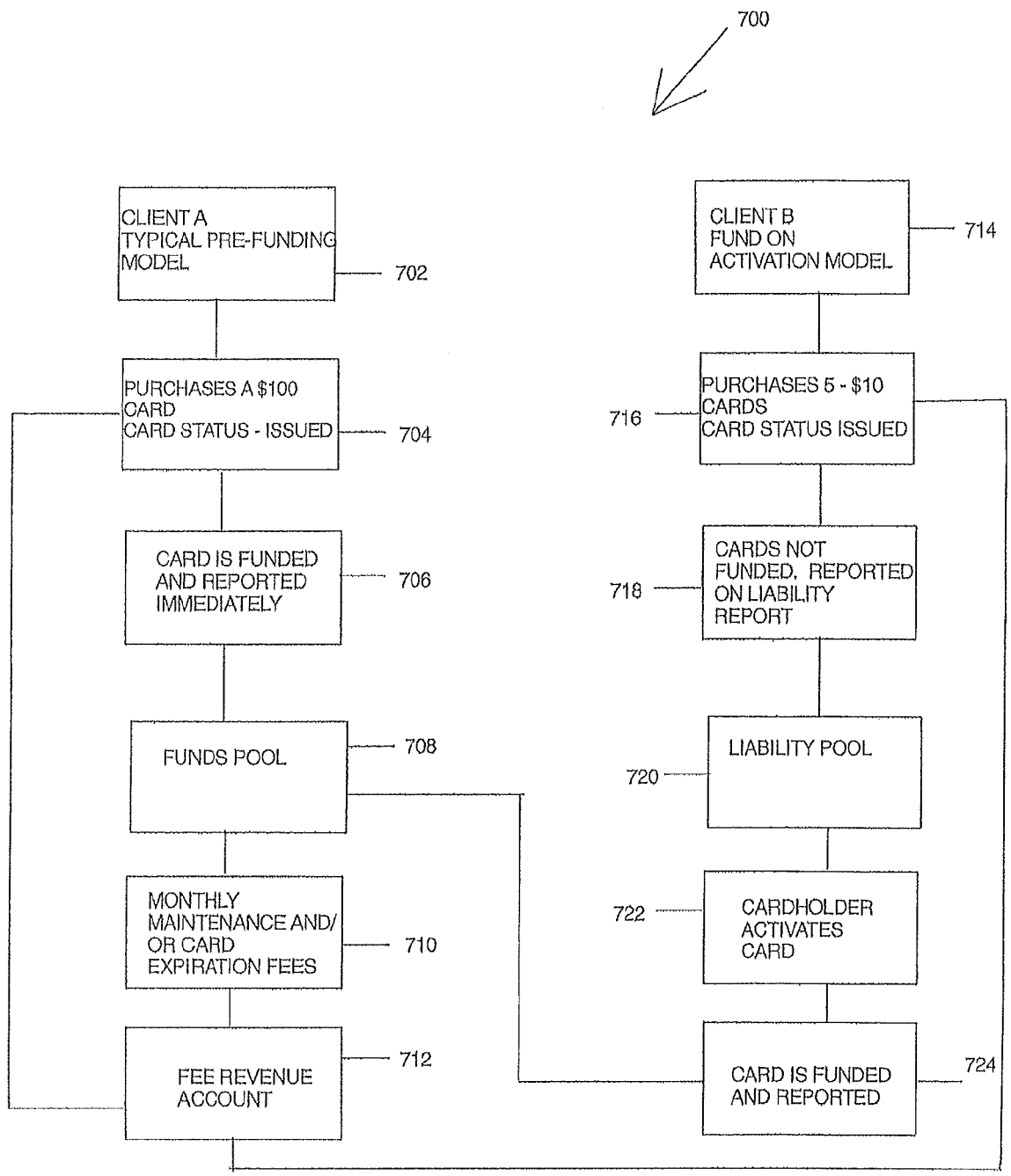
FIG. 7 is a financial transaction card workflow diagram using a typical pre-funding model or a fund on activation model.

Referring to FIG. 7 a financial transaction card workflow diagram 700 is presented using a typical pre-funding model 702 or a fund on activation model 714, constructed and operative in accordance with an embodiment of the present invention. In the conventional prefunding model, a prepaid financial transaction card buyer 900 purchases one hundred cards 704. The cards have a status as "Issued". The card is funded and reported 706. A funds pool 708 is created and monthly maintenance and/or card expiration fees are taken out of the outstanding balance of the funds pool. A fee revenue account 712 is also created to account for changes in revenue over time. Under the fund on activation model 714, in a non-limiting embodiment, a hypothetical purchase of five (5) ten dollar ($10) cards is made. The cards at this point are provided with a "Card Issued" status 716. The cards are not funded, but are rather funded during the Funding on Activation principle described above 718. The cards are reported on a liability report. The cards generated are then recorded in a liability pool 720. A card holder/consumer 910 then activates the card 722. The card is funded, after activation by the system, and monies are provided into a funds pool, at block 708.

Figure 8:
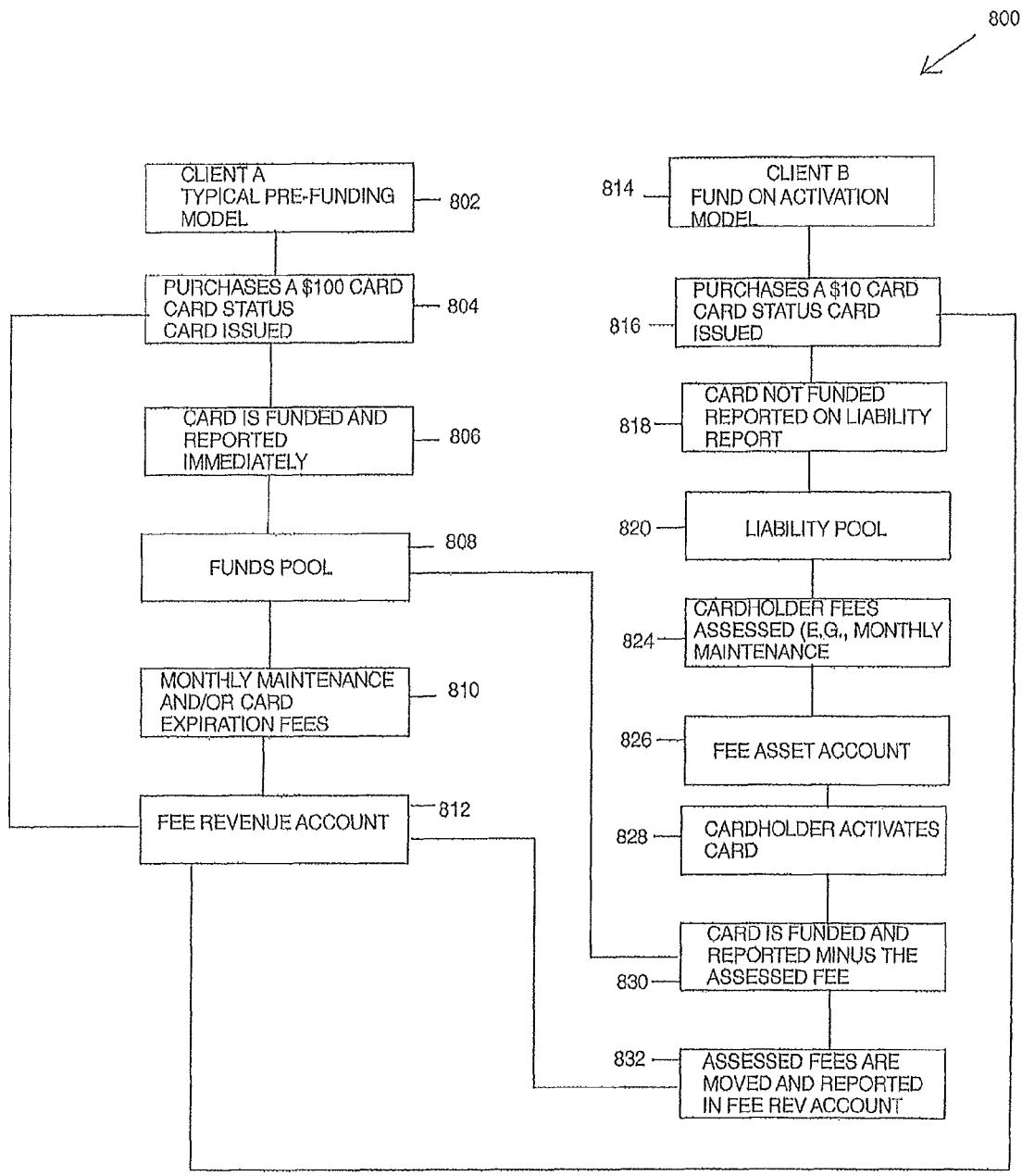
FIG. 8 is a financial transaction card workflow diagram dealing with cardholder fees.

Referring to FIG. 8, a financial transaction card workflow diagram dealing with cardholder fees is presented 800, constructed and operative in accordance with an embodiment of the present invention. Client A 802 presents a typical prefunding model for a financial transaction card. A hypothetical purchaser of the card purchases a one hundred ($100) card. The card is provided with a card issued status 804. The card is immediately funded and reported at block 806. The funds for the card(s) are placed within a funds pool 808. Monthly maintenance fees and/or card expiration fees are withdrawn, as necessary, at block 810. A fee revenue account is also maintained for the transactions provided to maintain track of activities within the prefunding model 812.

For client B in FIG. 8, a fund on activation model 814 is conducted. The client purchases a hypothetical ten ($10) dollar card 816. The card is generated with a "card issued" status. The card is not funded 818, as in the typical pre-funding model, but rather is reported in a liability pool 820. Card holder fees are assessed, in the embodiment, on a monthly basis 824. The monthly fees can be, for example, two dollars per period. A fee asset account is created where the fees are tracked 826. A card holder then activates the card 828 for use. After activation by the card holder, the system then activates the card for use up to the amount of money for the value of the card. The amount of funding is reported minus the assessed fee presented at block 830. The amount of funds that are contained at block 830 are provided to a funds pool 808, as in the conventional pre-funding method. Assessed fees are moved and reported in a fee revenue account to provide for accurate tracking of fees 832. Such assessed fees are tracked by a fee revenue account 812.

The debit processing system 1400 may also be configured to perform a "bulk close" of cards that have been purchased, but not yet activated, that use the Fund on Activation method. As such, a list of the bulk cards ordered or that are linked is maintained by the system 1400. These cards that are linked may then be closed as desired. Cards that have been identified as a "Fund on Activation method" may also be replaced, in bulk, as necessary.

The debit processing system 1400 may also provide for detailed reports on bulk batches or individual cards. Detailed reports of liability pool funds for each individual card, liability pool summary reports for the entire pool, fee asset account reports, expired liability pool card reports, expired liability pool card reports (individual or batch), payment/funding transaction activity reports, totals for fund on activation reports, outstanding liability pool reports, expired card reports, and remaining balance reports may be generated.

Embodiments provide a transaction card and a method for funding the transaction card that will minimize the amount of money that a purchaser commits when purchasing the card.

Embodiments further provide a transaction card and a method to fund the card that will provide for the security of the funds during use, while maintaining the convenience of use of the card.

In the foregoing specification, the aspects have been described with reference to specific embodiments thereof. It will, however, be evident that various modifications and changes may be made thereunto without departing from the broader spirit and scope as set forth in the appended claims. The specification and drawings are accordingly to be regarded in an illustrative rather than in a restrictive sense.

What is claimed is:

1. A system of finding a financial transaction card, comprising:
 a card issuer-generator configured to generate a financial transaction card, the financial transaction card having a face value,
  wherein the face value is provided and specifiable in an order of the financial transaction card, and
  wherein an amount of funds pertaining to the face value is placed in a liability pool database upon the order completion of the financial transaction card, and
  wherein the financial transaction card has an actual value of zero that remains zero following the order completion and prior to activation of the financial transaction card; and
 an activation interface configured to receive an electronic activation request for the financial transaction card from a customer.

2. The system of claim 1 further comprising:
 a financial card funder configured to fund a funds pool for the financial transaction card with the funds from the liability pool database after the activation of the financial transaction card, wherein only funds from the funds pool is available for conducting a purchase.

3. The system of claim 2, further comprising:
 a cardholder database configured to store information about the financial transaction card funds pool.

4. The system of claim 3, further comprising:
 a card balance reporter configured to apply fees against the funds pool.

5. The system of claim 4, wherein the authentication interface is configured to receive the electronic activation request via a telephone line.

6. The system of claim 5, wherein the authentication interface is configured to receive the electronic activation request via an Internet interface.

7. The system of claim 6, wherein the Internet interface is the World-Wide-Web.

8. The system of claim 7, further comprising:
 a card expirator configured to change status of the financial transaction card to "expired."

9. The system of claim 8, wherein the card expirator is further configured to remove the financial transaction card from the liability pool database.

10. A processor-implemented method of funding a financial transaction card, comprising:
 providing, using a processor, a financial transaction card to a user, the financial transaction card having a face value,
  wherein the face value is provided and specifiable in an order of the financial transaction card, and
  wherein an amount of funds pertaining to the face value is placed in a liability pool database upon the order completion of the financial transaction card, and
  wherein the financial transaction card has an actual value of zero that remains zero following the order completion and prior to activation of the financial transaction card; and
 receiving an activating request for the financial transaction card by a customer.

11. The method of claim 10 further comprising:
 funding a funds pool for the financial transaction card with the funds from the liability account after the activation of the financial transaction card, wherein only funds from the funds pool is available for conducting a purchase.

12. A computer-readable storage medium encoded with data and instructions, that when executed by a computing device, causes the computing device to:
 provide a financial transaction card to a user, the financial transaction card having a face value,
  wherein the face value is provided and specifiable in an order of the financial transaction card, and
  wherein an amount of funds pertaining to the face value is placed in a liability pool database upon the order completion of the financial transaction card, and
  wherein the financial transaction card has an actual value of zero that remains zero following the order completion and prior to activation of the financial transaction card; and receive an activating request for the financial transaction card by a customer.

13. The computer-readable storage medium of claim 12 further comprising instructions to:
fund a funds pool for the financial transaction card with the funds from the liability account after the activation of the financial transaction card, wherein only funds from the funds pool is available for conducting a purchase.

\* \* \* \* \*